United States Patent
Chai

(10) Patent No.: US 11,573,924 B2
(45) Date of Patent: *Feb. 7, 2023

(54) SYSTEM AND METHOD FOR EFFICIENT STORAGE OF SMALL FILES ON FILE-SYSTEM-BASED STORAGE DEVICES

(71) Applicant: Verint Systems Ltd., Herzliya Pituach (IL)

(72) Inventor: Yossi Chai, Herzliya Pituach (IL)

(73) Assignee: COGNYTE TECHNOLOGIES ISRAEL LTD., Herzliya (IL)

( * ) Notice: Subject to any disclaimer, the term of this patent is extended or adjusted under 35 U.S.C. 154(b) by 347 days.

This patent is subject to a terminal disclaimer.

(21) Appl. No.: 16/578,516

(22) Filed: Sep. 23, 2019

(65) Prior Publication Data

US 2020/0019533 A1 Jan. 16, 2020

Related U.S. Application Data

(63) Continuation of application No. 14/807,814, filed on Jul. 23, 2015, now Pat. No. 10,423,574.

(30) Foreign Application Priority Data

Jul. 24, 2014 (IL) .......................................... 233775

(51) Int. Cl.
*G06F 16/13* (2019.01)

(52) U.S. Cl.
CPC .................................... *G06F 16/13* (2019.01)

(58) Field of Classification Search
CPC ........ G06F 16/13; G06F 16/113; G06F 16/27; G06F 16/184; G06F 16/1748; G06F 16/275; G06F 16/182; G06F 16/1727; G06F 16/128; G06F 16/11; G06F 16/162; G06F 16/16; G06F 16/1815; G06F 16/1844; G06F 16/1827; G06F 16/148; G06F 16/10; G06F 16/17; G06F 16/285

See application file for complete search history.

(56) References Cited

U.S. PATENT DOCUMENTS

| | | | |
|---|---|---|---|
| 7,310,644 B2 | 12/2007 | Adya et al. | |
| 7,359,937 B2 | 4/2008 | Douceur et al. | |
| 7,401,080 B2 * | 7/2008 | Benton | ................ G06F 16/137 707/692 |
| 7,444,387 B2 | 10/2008 | Douceur et al. | |
| 7,509,423 B2 | 3/2009 | Douceur et al. | |

(Continued)

*Primary Examiner* — Son T Hoang

(74) *Attorney, Agent, or Firm* — Isus Intellectual Property PLLC; Anthony Jason Mirabito

(57) ABSTRACT

Methods and systems for storing and managing large numbers of small files. A data processing system includes clients that generate large numbers be stored on a storage device managed by a File System (FS). An Archive Server (AS) receives multiple files from the client, archives the files in larger archives, and sends the archives to the FS for storage. When requested to read a file, the AS retrieves the archive in which the file is stored, extracts the file and sends it to the requesting client. In other words, the AS communicates with the clients in individual file units, and with the storage device in archive units. The AS is typically constructed as an add-on layer on top of a conventional FS, which enables the FS to handle small files efficiently without modification.

19 Claims, 2 Drawing Sheets

(56) References Cited

U.S. PATENT DOCUMENTS

| | | | |
|---|---|---|---|
| 8,019,730 B2* | 9/2011 | Forster | G06F 11/1464 |
| | | | 707/667 |
| 9,236,079 B2* | 1/2016 | Prahlad | G11B 5/86 |
| 2003/0206717 A1* | 11/2003 | Yogeshwar | G06F 16/71 |
| | | | 386/328 |
| 2005/0172124 A1* | 8/2005 | Carpentier | H04L 29/00 |
| | | | 713/165 |
| 2006/0265426 A1* | 11/2006 | Chen | G06F 16/10 |
| 2007/0005758 A1* | 1/2007 | Hughes | H04N 21/4424 |
| | | | 709/224 |
| 2008/0229037 A1* | 9/2008 | Bunte | G06F 16/113 |
| | | | 711/E12.103 |
| 2013/0218916 A1* | 8/2013 | Suzuki | G06F 16/11 |
| | | | 707/755 |
| 2016/0210203 A1* | 7/2016 | Kumarasamy | G06F 3/067 |

* cited by examiner

SYSTEM AND METHOD FOR EFFICIENT STORAGE OF SMALL FILES ON FILE-SYSTEM-BASED STORAGE DEVICES

This application is a continuation application of U.S. patent application Ser. No. 14/807,814, filed Jul. 23, 2015, now patented, which claims priority benefit of Israeli Patent Application No. 233775, filed on Jul. 24, 2014, both of which are incorporated by reference herein in their entirety as if fully set forth herein.

FIELD OF THE DISCLOSURE

The present disclosure relates generally to data storage, and particularly to methods and systems for storage of files in File-System (FS) based storage devices.

BACKGROUND OF THE DISCLOSURE

Various types of data processing systems generate multiple small files that should be stored for later retrieval and use. For example, communication monitoring and analytics systems typically generate large numbers of small-size files that store content, metadata and other information relating to monitored communication sessions.

SUMMARY OF THE DISCLOSURE

An embodiment that is described herein provides a method for data storage, including receiving a plurality of files to be stored on a storage device that is managed by a File System (FS). An association is determined between at least first and second duplicate occurrences of a given file in the plurality. The files, including the given file, are assigned to one or more archives based on the association. The archives are sent to the FS for storage on the storage device.

Typically, determining the association and assigning the files to the archives are performed transparently to the FS. In some embodiments, assigning the files to the archives includes maintaining a catalog that specifies, for each file including the given file, a respective one of the archives in which the file is stored. In an embodiment, assigning the files to the archives includes storing a single copy of the given file in a selected archive, and recording both the first occurrence and the second occurrence of the given file in the catalog as stored in the selected archive.

In another embodiment, maintaining the catalog includes maintaining respective separate first and second validity indications for the first and second occurrences of the given file. In an example embodiment, the method includes permitting deletion of an archive, in which the given file is stored, only when the first and second validity indications indicate that the first and second occurrences of the given file are both invalid.

In yet another embodiment, the method includes, upon receiving a request to read the given file, retrieving from the storage device an archive in which the given file is stored, extracting the given file from the retrieved archive, and serving the extracted given file in response to the request. In still another embodiment, assigning the files to the archives includes deciding to close a current archive and assign subsequently received files to a new archive based on a predefined criterion. The criterion may be based on at least one factor selected from a group of factors consisting of: time that elapsed since the current archive was created; a data size of the current archive; a number of the files stored in the current archive; names of the files stored in the current archive; and types of the files stored in the current archive.

There is additionally provided, in accordance with an embodiment that is described herein, an archiving system including an interface and one or more processors. The interface is configured to communicate with one or more client devices. The one or more processors are configured to receive over the interface from the client devices a plurality of files to be stored on a storage device that is managed by a File System (FS), to determine an association between at least first and second duplicate occurrences of a given file in the plurality, to assign the files, including the given file, to one or more archives based on the association, and to send the archives to the FS for storage on the storage device.

There is also provided, in accordance with an embodiment that is described herein, a data processing system including a storage device, one or more client devices, and one or more archiving processors. The storage device is managed by a File System (FS). The one or more client devices are configured to generate a plurality of files for storage on the storage device. The one or more archiving processors are configured to determine an association between at least first and second duplicate occurrences of a given file in the plurality, to assign the files, including the given file, to one or more archives based on the association, and to send the archives to the FS for storage on the storage device.

The present disclosure will be more fully understood from the following detailed description of the embodiments thereof, taken together with the drawings in which:

DETAILED DESCRIPTION OF EMBODIMENTS

Overview

Figure 1:
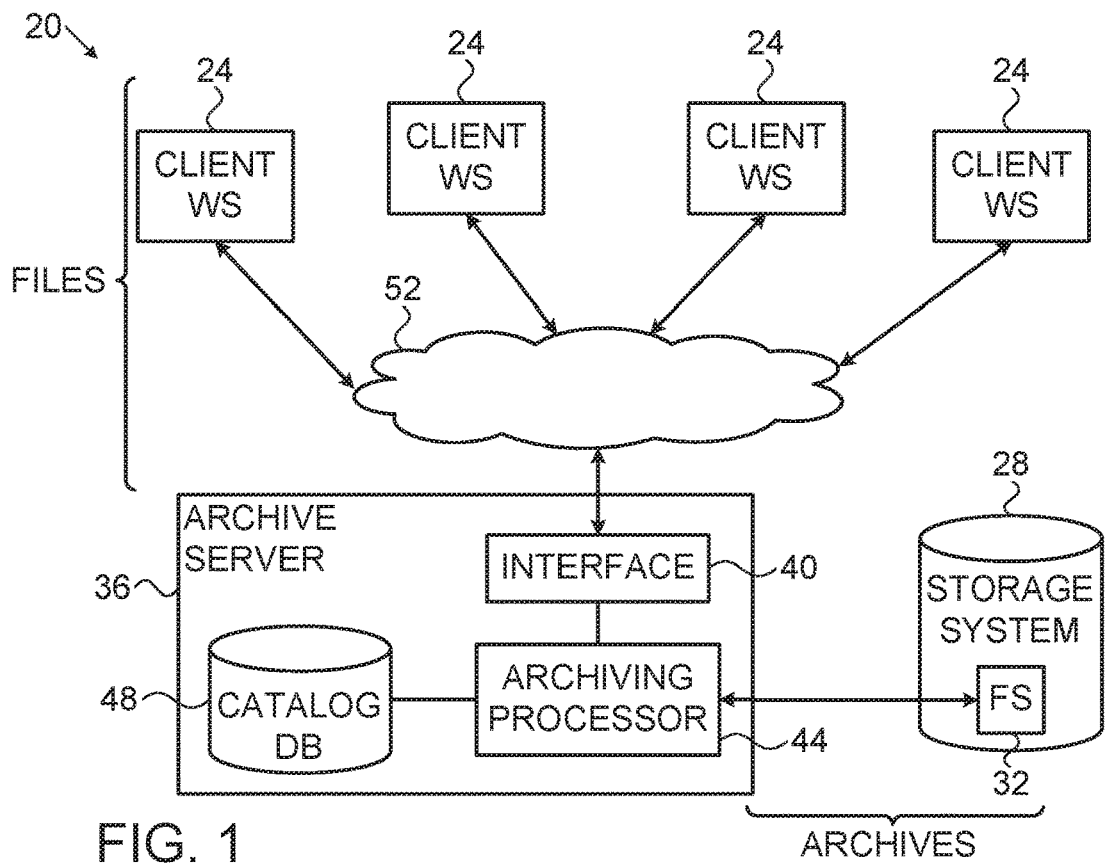
FIG. 1 is a block diagram that schematically illustrates a data processing system, in accordance with an embodiment that is described herein.

Management and storage of small files is a major challenge for File Systems (FSs), and most FSs do not perform well in this respect. When the average file size is small, e.g., on the order of several KB, the storage space needed for metadata is often of the same order as the storage space needed for the actual file content. Moreover, when the number of small files is large, the FS often exhausts its random Input/Output (I/O) resources for managing them.

Many FSs store data in native allocation units, whose size is typically much larger than the average size of a small file. As a result, storage volume efficiency is degraded considerably. Since it is practically unfeasible to tune a given FS to efficiently support both small and large files, most FSs are optimized for handling larger files, at the expense of poor performance in managing small files.

Embodiments that are described herein provide improved methods and systems for storing and managing large numbers of small files. In the disclosed embodiments, a data processing system comprises clients that generate large numbers of files, typically small files, to be stored on a storage device managed by a File System (FS). In the context of the present patent application and in the claims, the term "small file" refers to any file size that is smaller than the native allocation unit of the FS.

The system comprises one or more archiving processors that mediate between the workload profile of the clients, which is characterized by large numbers of small files, and the performance preferences of the FS. The operation of the AS is typically transparent to both the FS and the clients. The description that follows refers mainly to a centralized Archive Server (AS). Alternatively, however, the disclosed techniques may be performed using various distributed schemes.

Typically, the AS receives the multiple files from the client, archives the files in larger archives, and sends the archives to the FS for storage. When requested to read a file, the AS retrieves the archive in which the file is stored, extracts the file and sends it to the requesting client. In other words, the AS communicates with the clients in individual file units, and with the storage device in archive units.

The above operations are typically transparent to both the clients and the FS. In other words, the AS is typically constructed as an add-on layer on top of a conventional FS, which enables the FS to handle small files efficiently without modification. Since the AS relieves the FS of the need to manage small files, the FS performance is improved considerably.

In some embodiments, the AS assigns files to archives while taking into account duplicate occurrences of files. In many practical scenarios, a given file may be sent for storage more than once, possibly by different clients. By recognizing such duplicate occurrences, the AS is able to avoid unnecessary storage of duplicate copies of the same file. Example storage processes that exploit the associations between duplicate file occurrences, such as in deduplication and purging of archives, are described herein.

System Description

FIG. 1 is a block diagram that schematically illustrates a data processing system 20, in accordance with an embodiment that is described herein. System 20 comprises multiple client Work Stations (WSs) 24, also referred to as clients. Clients 24 run applications that, as part of their operation, generate a large number of small files that should be stored and managed.

In an example embodiment, system 20 comprises a communication analytics system that monitors and analyzes communication sessions of network users and produces a large number of analytics products. Alternatively, however, system 20 may comprise any other suitable type of system that is characterized by production of a large volume of relatively small files for storage.

System 20 comprises a storage system 28 for storing the files generated by clients 24. Storage system 28 may comprise any suitable number of storage devices of any suitable type, such as, for example, Hard Disk Drives (HDDs) tapes or Blu-Ray storage devices. Storage system 28 is managed by a File System (FS) 32. FS 32 receives files for storage and stores and manages them in the storage devices of system 28, and retrieves files from storage upon requests.

FS 32 may comprise any suitable type of file system, such as, for example, NetApp Data OnTap, EMC Isilon OneFS or IBM GPFS. Communication with storage system 28, and thus with FS 32, may be implemented using any suitable storage protocol, such as, for example, CIFS-1, CIFS-2, CIFS-3 or NFS. Storage system 32 may comprise a commercial storage solution such as, for example, solutions offered by IBM, NetApp, EMC, HP, Hitachi and others.

As noted above, the applications running on clients 24 typically generate a large volume of relatively small files. In an example scenario, system 20 may comprise on the order of twenty clients, each generating on the order of a thousand files per second. The characteristic file size is on the order of 1 KB. This average file size is small, in the sense that it is smaller than the native allocation unit of the FS, which is typically on the order of 8 KB, 16 KB, 32 KB or 64 KB. The above figures are given, however, purely by way of example. The disclosed techniques can be used with any other suitable client workload and FS characteristics.

This sort of workload is extremely difficult to handle by FS 32. File systems in general are highly efficient in handling large sequential files, and their efficiency deteriorates rapidly when the files are small, fragmented and random in nature. As such, FS 32 is likely to perform poorly if it were to store the files generated by clients 24 without some pre-processing. As explained above, such poor performance is due to a number of factors, including exhaustion of FS I/O resources and management data structures.

For this purpose, system 20 comprises an Archive Server (AS) 36, which mediates between the workload profile of clients 24 and the performance preferences of FS 32. Server 36 receives the large volume of small files from clients 24, archives them in larger archives, and sends the archives to FS 32 for storage in storage system 28. In particular, server 36 identifies duplicate occurrences of files in the stream of files received from the clients, and manages the archiving operations efficiently, while considering these duplicate occurrences. The operation of AS 36 is explained and demonstrated in detail below.

In the present example, AS 36 comprises an interface for communicating with clients 24, an archiving processor 44 that carries out the methods described herein, and a catalog database 48 that maintains a catalog of files and archives. In alternative embodiments, however, AS 36 may have any other suitable configuration. Processor 44 may comprise any suitable processor. Database 48 may be implemented using any suitable memory or storage device, e.g., SSD or other non-volatile storage medium, and/or a suitable volatile memory such as Random Access Memory (RAM).

The configurations of system 20, AS 36 and storage system 28 are example configurations that are chosen purely for the sake of conceptual clarity. In alternative embodiments, any other suitable configurations can be used. For example, instead of carrying out the archiving functions using a single centralized server, the functions of AS 36 may be carried out in a distributed fashion by multiple processors and/or catalogs. For example, the functions of AS 36 may be implemented by the processors of client WSs 24, or internally in storage system 28.

Client WS2 24 may comprise any suitable type of computing devices, such as servers or personal computers. In the present example, clients 24 are connected to AS 36 using a network 52, such as a Local-Area Network (LAN), and AS 36 is connected to storage system 28 over a direct link using some suitable storage protocol. This configuration, however, is depicted purely by way of example. In alternative embodiments, the connection between clients 24 and AS 36, and the connection between AS 36 and storage system 28, may be implemented using any suitable communication means.

Certain elements of AS 36 can be implemented using hardware, such as using one or more Application-Specific Integrated Circuits (ASICs) or Field-Programmable Gate Arrays (FPGAs) or other device types. Additionally or alternatively, certain elements of AS 36 can be implemented using software, or using a combination of hardware and software elements. Typically, archiving processor 44 comprises one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Efficient Archiving and Management of Small Files

In some embodiments, Archive Server (AS) 36 mediates between client WSs 24 and storage system 28, so that FS 32 does not have to handle the large volume of small files generated by the clients. Typically, AS 36 receives the files from clients 24 and groups the files in data structures that are referred to as archives. Each archive comprises multiple files, typically generated by a single client 24. AS 36 sends to FS complete archives instead of individual files. As a result, the performance of FS 32 is improved considerably.

The number of files per archive may vary, for example, as a function of the average file size and archive size. Typically, the archive size should be at least two orders of magnitude larger than the native allocation unit of the FS. Thus, for example, when the FS native allocation unit is on the order of 8-64 KB, the archive size is typically on the order of one or several GB.

In an embodiment, the average archive size is optimized for network bandwidth between AS 36 and storage system 28. For a 1 Gbps connection, for example, the average archive size may be set between 128 KB and 30 MB. An archive size of 1 MB and an average file size of 1 KB would result in approximately one thousand files per archive. For a FS whose native allocation unit is 64 KB, the archiving operation would thus enable the FS to perform only 15 IOPS instead of 1000 IOPS. Note that de-duplication would potentially increase the number of files.

AS 36 may use any suitable archiving format for generating the archives. Example format include, but are not limited to, ZIP, Tar, Jar, 7zip, rar, as well as various proprietary formats. In some embodiments, although not necessarily, the archiving operation involves compression of the file contents.

Typically, AS 36 is transparent to the clients and to the FS. Clients 24 send individual files for storage, and request and receive individual files retrieved from storage, and are typically unaware of the archiving and extraction operations performed by AS 36. FS 32 receives archives for storage and requests for fetching archives en-bloc, and is typically not aware that these requests do not arrive from the clients directly.

In an alternative embodiment, the clients and AS communicate using a dedicated Application Programming Interface (API). This configuration is is not transparent to the clients, but is potentially more efficient in communicating with the clients.

In practice, the stream of files arriving from clients 24 often comprises duplicate occurrences of certain files. In other words, a certain file may be sent for storage multiple times. Duplicate occurrences of a given file may originate from the same client or from different clients. In some embodiments, AS 36 identifies duplicate occurrences of files, and uses them to increase the efficiency of the archiving operations. These techniques are detailed further below.

In some embodiments, processor 44 of AS 36 maintains in database 48 a catalog that specifies the structure of the various archives. In an example embodiment, the catalog has the following structure:

TABLE 1

| Context | File | ID |
|---------|------|-----|
| C1 | F1 | ID1 |
|  | F2 | ID2 |
|  | F3 | ID3 |
|  | F4 | ID4 |
| C2 | F5 | ID5 |
|  | F6 | ID6 |
|  | F7 (F1) | ID1 |
|  | F8 | ID7 |
|  | F9 | ID7 |
| ... | ... | ... |

TABLE 2

| ID | Valid | Archive |
|-----|-------|---------|
| ID1 | 2 | ARC1 |
| ID2 | 0 | ARC1 |
| ID3 | 1 | ARC1 |
| ID4 | 1 | ARC1 |
| ID5 | 1 | ARC2 |
| ID6 | 1 | ARC2 |
| ID7 | 1 | ARC1 |
| ID8 | 1 | ARC2 |
| ... | ... | ... |

In the present example, the catalog refers to nine files denoted F1 . . . F9, which are stored in two archives denoted ARC1 and ARC2. Each file is also associated with a certain context, e.g., a certain session in which it was generated. Another file attribute in the catalog, denoted "valid," specifies whether the file was deleted by the client or whether it is still valid. In an example embodiment, a "0" value indicates that the file is not valid. A positive value indicates that the file is valid, and indicates the number of files attached to the same ID. This attribute is useful, for example, in deciding when a given archive can be purged, and helps in managing the FS fragmentation and various purging algorithms.

In some embodiments, AS 36 carries out a file deduplication process, which uses the association between duplicate occurrences of files to avoid unnecessary storage of duplicate physical copies of the same file. For example, as can be seen in Table 1, files F1 and F7 actually contain the same content—once in context C1 and again in context C2. As such, the two files are assigned the same ID (ID1). Aside from this duplicate occurrence, the files of context C1 are stored in archive ARC1 and the files of context C2 are stored in archive ARC2. File F1, however, is stored only in archive ARC1 (as indicated by the "archive" attribute of ID1).

In some embodiments, when identifying a new occurrence of a given file that is already stored in a certain archive, AS 36 creates a catalog entry for the new occurrence, but does not store the actual file again. Instead, AS 36 sets the newly-created catalog entry to indicate the archive in which the actual file is stored.

In the example above, when creating ARC2 for the files of context C2, AS 36 detects that file F7 has the same content as file F1 that is already stored in ARC1 as part of context C1. Instead of storing F7 again in ARC2, AS 36 sets the "archive" attribute of ID1 to be "ARC1".

On readout, if a client sends a request to retrieve either file F1 or file F7, AS 36 retrieves archive ARC1 and extracts F1 from ARC1 (regardless if the client request was related to context C1 or to C2). As a result, storage space in storage system 28 is used more efficiently. This efficiency comes at a certain cost—When retrieving files for context C2 (most of which are stored in archive ARC2), it is also necessary for AS 36 to retrieve archive ARC1 (for extracting F1).

In some embodiments, AS 36 identifies archives whose files are all invalid (i.e., deleted by the clients), and instructs FS 32 to delete ("purge") these archives from storage system 28. The purging process, however, should take into account the fact that some files are physically stored in a given archive but logically associated with multiple contexts. Typically, AS 36 deletes an archive having such a file only upon verifying that all the occurrences of this file are marked as invalid.

In the catalog of Tables 1 and 2 above, for example, file F1 is physically stored only in archive ARC1, but is used by both context C1 and context C2. In practice, it is quite possible that one context (e.g., one client) will delete F1, but another context (e.g., a different client) will still use it. In such a case, archive ARC1 should not be deleted.

In an embodiment, when considering to purge a given archive, AS 36 first ensures (using the catalog) that all files of the archive are marked as invalid by all the processes that use these files. In the example of Table 1, AS 36 will delete ARC1 only if both occurrences of F1 (in C1 and in C2) are marked as invalid.

This process can be improved, for example by moving files from one archive to another in order to purge an almost-invalid archive. In other words, if almost all files in a given archive are invalid, except for a small number of files, AS 36 may retrieve these files, add them to a different archive, and purge the given archive. Further alternatively, various efficient purging schemes can be defined. Generally speaking, AS 36 may carry out various elastic purging schemes, which make use of catalog updates that do not involve the FS, minimal I/O in deleting archives en-bloc, and on-going background defragmentation.

The highly simplified processes above are shown purely by way of example, in order to demonstrate how associating duplicate occurrences of files can be used for efficient archiving. In alternative embodiments, AS 36 may maintain a catalog having any other suitable structure, and may exploit duplicate file occurrences in any other suitable way.

Example Storage and Readout Schemes

Figure 2:
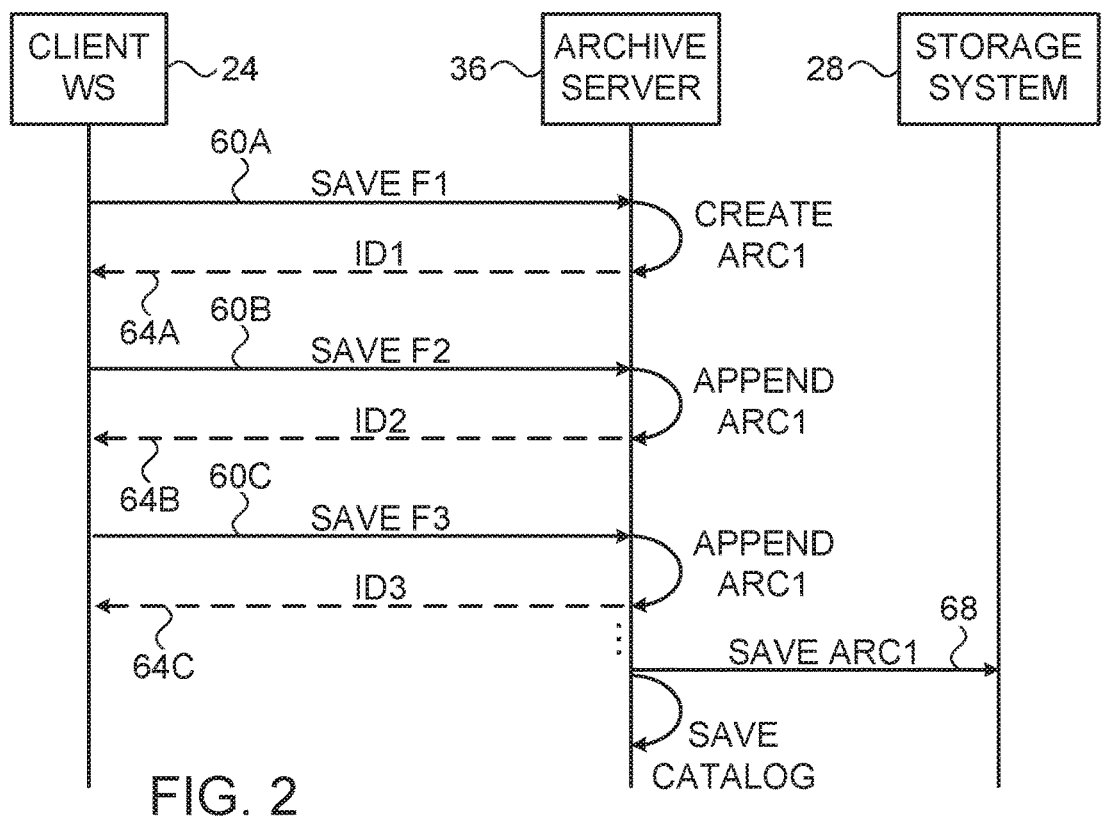
FIG. 2 is a diagram that schematically illustrates a file storage process, in accordance with an embodiment that is described herein.

FIG. 2 is a diagram that schematically illustrates the interaction between client 24, AS 36 and storage system 28 (and thus FS 32) during storage of files, in accordance with an embodiment that is described herein. The process begins with client 24 sending file F1 for storage (arrow 60A). Since F1 is the first file in its archive, AS 36 creates a new archive ARC1. AS 36 then adds F1 to ARC1, updates the catalog accordingly, and issues a respective identifier ID1 for file F1. AS 36 sends an acknowledgement (arrow 64A) to client 24, indicating the identifier ID1. Client 24 typically records this identifier, for use in subsequent retrieval of F1.

The process is repeated in a similar manner for two additional files F2 and F3, which AS 36 appends to archive ARC1. The respective storage commands for F2 and F3 are marked with arrows 60B and 60C, the acknowledgements are marked with arrows 64B and 64C, and the identifiers denoted ID2 and ID3, respectively. Until this point, AS 36 does not send any data for storage in storage system 28, but rather adds the files to Archive ARC1.

At a certain point in time, AS 36 decides to close archive ARC1 and store it in storage system 28. This operation is marked by an arrow 68. The AS then saves the updated catalog to database 48. Subsequently, the catalog is updated as additional files are appended. AS 36 may decide to close and save an archive based on any suitable criterion, for example after a certain maximum time duration since the archive was created, when the archive reaches a certain maximum data size or a certain maximum number of files, or depending on file names or file types.

The decision to close an archive is typically independent of and transparent to client 24 and storage system 28. As explained above, AS 36 may perform de-duplication by calculating a hash on the file content and searching the catalog for an ID having the same hash value.

Figure 3:
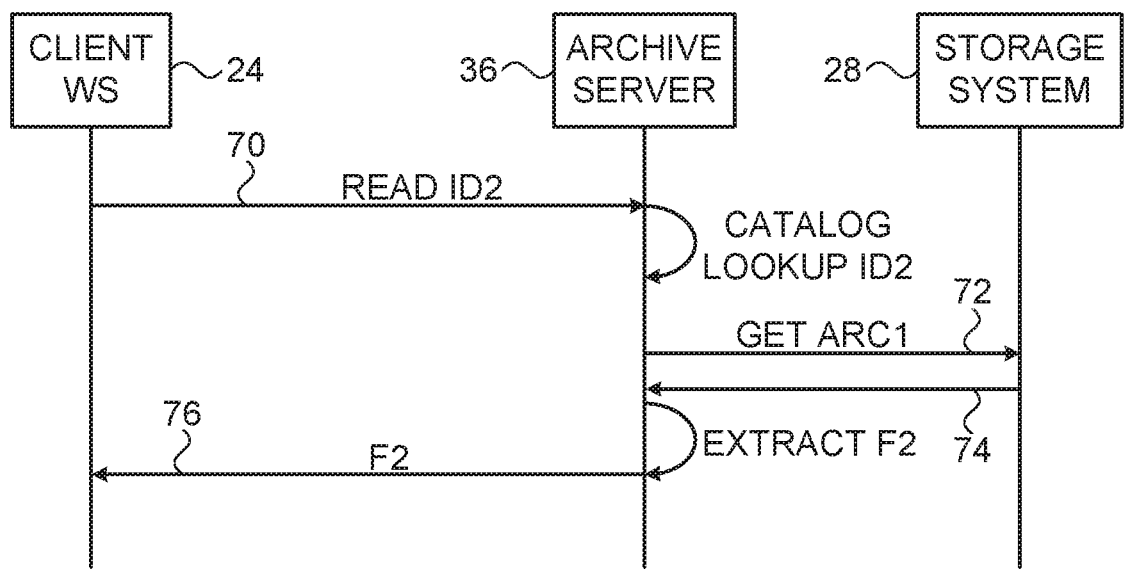
FIG. 3 is a diagram that schematically illustrates a file retrieval process, in accordance with an embodiment that is described herein.

FIG. 3 is a diagram that schematically illustrates the interaction between client 24, AS 36 and storage system 28 (and thus FS 32) in retrieval of a file, in accordance with an embodiment that is described herein. The process begins with client 24 sending a read command for file F2 (arrow 70). Typically, the read command specifies the identifier (ID2) assigned to the file during storage.

In response to the read request, AS 36 looks-up the catalog for an entry having ID2. The lookup operation returns the identity of the archive in which F2 is stored, i.e., ARC1. AS 36 then gets archive ARC1 from storage system 28 (arrows 72 and 74). Upon obtaining ARC1, AS 36 extracts file F2 from ARC1, and sends the requested file to client 24 (arrow 76).

In alternative embodiments, AS 36 may perform various additional functions that benefit from the above system configuration. For example, AS 36 may perform operations on the physical files, such as virus scanning. In an example embodiment, AS 36 searches the files for viruses or other malware, and adds to the catalog information regarding detected malware. Since the catalog points to multiple files depending on common content, the same infected file can be marked and handled with minimal time and computational effort. As another example, AS 36 may support file-version management by extending the catalog capabilities.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A method for data storage, comprising:
receiving, from a client device, a plurality of files to be stored on a storage device that is managed by a File System (FS), wherein the size of each of the plurality of files to be stored is smaller than a native allocation unit of storage allocated for storage on the storage device, and wherein the number of files in the plurality of files exceeds input/output (I/O) resources of the storage device;

determining an association between at least a first duplicate occurrence and a second duplicate occurrence of a given file in the plurality of files;

assigning the plurality of files, including the given file, to one or more archives based on the association, wherein each archive comprises a group of files assigned from the plurality of files, and wherein a size of each of the one or more archives is larger than the native allocation unit of storage;

sending the one or more archives to the FS for storage on the storage device, wherein the sending of the one or more archives does not exceed the I/O resources of the storage device;

updating a database stored on an archive server, separate from the storage device, with information linking an identifier of the group of files to each of the one or more archives; and transmitting the identifiers of the groups of files to the client device for future retrieval.

2. The method according to claim 1, wherein the determining the association and the assigning the plurality of files to the one or more archives are performed transparently to the FS.

3. The method according to claim 1, wherein the assigning the plurality of files to the one or more archives comprises maintaining a catalog that specifies, for each of the plurality of files including the given file, a respective one of the one or more archives in which the file is stored.

4. The method according to claim 3, wherein the assigning the plurality of files to the one or more archives comprises storing a single copy of the given file in a selected archive, and recording both the first duplicate occurrence and the second duplicate occurrence of the given file in the catalog as stored in the selected archive.

5. The method according to claim 3, wherein the maintaining the catalog comprises maintaining respective separate first and second validity indications for the first and second duplicate occurrences of the given file.

6. The method according to claim 5, further comprising permitting deletion of the respective one of the one or more archives, in which the given file is stored, only when the first and second validity indications indicate that the first and second duplicate occurrences of the given file are both invalid.

7. The method according to claim 1, further comprising, upon receiving a request to read the given file, retrieving from the storage device an archive in which the given file is stored, extracting the given file from the retrieved archive, and serving the extracted given file in response to the request.

8. The method according to claim 1, wherein the assigning the plurality of files to the one or more archives comprises deciding to close a current archive and assign subsequently received files to a new archive based on a predefined criterion.

9. The method according to claim 8, wherein the predefined criterion is based on at least one factor selected from a group of factors consisting of:
time that elapsed since the current archive was created;
a data size of the current archive;
a number of the plurality of files stored in the current archive;
names of the plurality of files stored in the current archive; and
types of the plurality of files stored in the current archive.

10. A hardware computing device for implementing a method of data storage, the method comprising:

receiving, from a client device, a plurality of files to be stored on a storage device that is managed by a File System (FS), wherein the size of each of the plurality of files to be stored is smaller than a native allocation unit of storage allocated for storage on the storage device, and wherein the number of files in the plurality of files exceeds input/output (I/O) resources of the storage device;

determining an association between at least a first duplicate occurrence and a second duplicate occurrence of a given file in the plurality of files;

assigning the plurality of files, including the given file, to one or more archives based on the association, wherein each archive comprises a group of files assigned from the plurality of files, and wherein a size of each of the one or more archives is larger than the native allocation unit of storage;

sending the one or more archives to the FS for storage on the storage device, wherein the sending of the one or more archives does not exceed the I/O resources of the storage device;

updating a database stored on an archive server, separate from the storage device, with information linking an identifier of the group of files to each of the one or more archives; and transmitting the identifiers of the groups of files to the client device for future retrieval.

11. The method according to claim 10, further comprising:
receiving a request from the client device to read a particular file, the request comprising the particular file's identifier;
querying the database on the archive server with the identifier to determine a particular archive in which the particular file is stored;
retrieving the particular archive from the storage device;
extracting the particular file from the particular archive; and
transmitting the particular file to the client device.

12. The method according to claim 10, further comprising:
detecting that a file received from the client device for storage is a duplicate of a file already stored in an archive of the one or more archives;
avoiding storing a copy of the duplicate in the storage system by updating the database stored on the archive server with information linking the file already stored in the archive to the file received from the client device; and
transmitting the identifier of the file already stored in the archive to the client device for future retrieval.

13. The method according to claim 10, wherein grouping of the plurality of files is performed by the archive server in electronic communication with more than one client device into more than one archive according to the client device from which the plurality of files originated.

14. The method according to claim 10, wherein the archive server is configured to provide a single copy of a file in the one or more archives to the client device.

15. A non-transitory computer-readable storage medium storing computer-executable instructions for implementing a method of data storage, the method comprising:

receiving, from a client device, a plurality of files to be stored on a storage device that is managed by a File System (FS), wherein the size of each of the plurality of files to be stored is smaller than a native allocation unit of storage allocated for storage on the storage device, and wherein the number of files in the plurality of files exceeds input/output (I/O) resources of the storage device;

determining an association between at least a first duplicate occurrence and a second duplicate occurrence of a given file in the plurality of files;

assigning the plurality of files, including the given file, to one or more archives based on the association, wherein each archive comprises a group of files assigned from the plurality of files, and wherein a size of each of the one or more archives is larger than the native allocation unit of storage;

sending the one or more archives to the FS for storage on the storage device, wherein the sending of the one or more archives does not exceed the I/O resources of the storage device;

updating a database stored on an archive server, separate from the storage device, with information linking an identifier of the group of files to each of the one or more archives; and transmitting the identifiers of the groups of files to the client device for future retrieval.

16. The method according to claim 15, further comprising:
   receiving a request from the client device to read a particular file, the request comprising the particular file's identifier;
   querying the database on the archive server with the identifier to determine a particular archive in which the particular file is stored;
   retrieving the particular archive from the storage device;
   extracting the particular file from the particular archive; and
   transmitting the particular file to the client device.

17. The method according to claim 15, further comprising:
   detecting that a file received from the client device for storage is a duplicate of a file already stored in an archive of the one or more archives;
   avoiding storing a copy of the duplicate in the storage system by updating the database stored on the archive server with information linking the file already stored in the archive to the file received from the client device; and
   transmitting the identifier of the file already stored in the archive to the client device for future retrieval.

18. The method according to claim 15, further comprising grouping the plurality of files into more than one archive according to the client device from which the plurality of files originated.

19. The method according to claim 15, further comprising providing a single copy of a file in the one or more archives to the client device.

* * * * *